US012759306B2

(12) United States Patent
Koase

(10) Patent No.: US 12,759,306 B2
(45) Date of Patent: Oct. 13, 2026

(54) VALVE MECHANISM, LIQUID EJECTION DEVICE, AND METHOD OF CONTROLLING LIQUID EJECTION DEVICE

(71) Applicant: SEIKO EPSON CORPORATION, Tokyo (JP)

(72) Inventor: Takashi Koase, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 173 days.

(21) Appl. No.: 18/941,200

(22) Filed: Nov. 8, 2024

(65) Prior Publication Data

US 2025/0153486 A1 May 15, 2025

(30) Foreign Application Priority Data

Nov. 10, 2023 (JP) ................................ 2023-192087

(51) Int. Cl.
*B41J 2/175* (2006.01)
*B05C 5/02* (2006.01)
*B05C 11/10* (2006.01)

(52) U.S. Cl.
CPC ......... *B41J 2/17596* (2013.01); *B05C 5/0225* (2013.01); *B05C 11/1002* (2013.01)

(58) Field of Classification Search
CPC ..... B41J 2/17596; B41J 2/175; B05C 5/0225; B05C 11/1002
See application file for complete search history.

(56) References Cited

U.S. PATENT DOCUMENTS

| | | | | |
|---|---|---|---|---|
| 4,737,801 A * | 4/1988 | Ichihashi | B41J 2/16523 | 347/85 |
| 4,876,558 A * | 10/1989 | Mamiya | B41J 2/17596 | 347/30 |
| 5,650,811 A * | 7/1997 | Seccombe | B41J 2/175 | 347/85 |
| 6,183,076 B1 * | 2/2001 | Childers | B41J 2/14145 | 347/86 |
| 9,358,802 B2 | 6/2016 | Akahane et al. | | |
| 2002/0109758 A1 * | 8/2002 | Kono | B41J 2/17509 | 347/85 |
| 2007/0222834 A1 * | 9/2007 | Seshimo | B41J 2/17509 | 347/85 |
| 2008/0297568 A1 * | 12/2008 | Seshimo | B41J 2/17509 | 347/85 |

FOREIGN PATENT DOCUMENTS

JP 2015-189201 A 11/2015

* cited by examiner

*Primary Examiner* — Donnell A Long
(74) *Attorney, Agent, or Firm* — WORKMAN NYDEGGER

(57) ABSTRACT

A valve mechanism 29 provided in flow path 26 through which a fluid flows includes a first base 39 formed a part of the flow path 26, a valve section 47 configured to close the flow path 26, a pressure receiving section 48 having flexibility, a first lid member 41 forming a first space 50 between the first lid member 41 and the pressure receiving section 48, and a lever section 42 provided in the first space 50, wherein The lever section 42 presses the valve section 47 in a direction of closing the flow path 26 based on displacement of the pressure receiving section 48 due to pressure reduction in the first space 50.

8 Claims, 4 Drawing Sheets

VALVE MECHANISM, LIQUID EJECTION DEVICE, AND METHOD OF CONTROLLING LIQUID EJECTION DEVICE

The present application is based on, and claims priority from JP Application Serial Number 2023-192087, filed Nov. 10, 2023, the disclosure of which is hereby incorporated by reference herein in its entirety.

BACKGROUND

1. Technical Field

The present disclosure relates to a valve mechanism, a liquid ejection device, and a method of controlling a liquid ejection device.

2. Related Art

For example, there is a recording device which is an example of a liquid ejection device that performs printing by ejecting ink that is an example of liquid from a liquid ejection head that is an example of the liquid ejection section, such as JP-A-2015-189201. The recording device includes a flow path through which ink is supplied and a flow path opening/closing unit which is an example of a valve mechanism.

The flow path opening/closing unit includes a third recess section, a fourth recess section, and a second flexible member. The second flexible member is provided between the third recess section and the fourth recess section. The third recess section and the second flexible member constitute an ink chamber for storing ink. The fourth recess section and the second flexible member constitute an air chamber. The flow path opening/closing unit closes the flow path by the second flexible member being displaced by the air supplied to the air chamber.

The flow path opening/closing unit shown in JP-A-2015-18920 closes the flow path by pressurizing the air chamber. When the air chamber is pressurized, the adhesion between the third recess section and the second flexible member constituting the air chamber may be insufficient, and leakage may occur.

SUMMARY

The valve mechanism for solving the above-described problem is provided in a flow path through which a fluid flows, and it includes a base in which a part of the flow path is formed, a valve section configured to close the flow path, a pressure receiving section having flexibility, a first lid member that forms a first space between the first lid member and the pressure receiving section, and a lever section provided in the first space, wherein the lever section pushes the valve section in a direction of closing the flow path based on displacement of the pressure receiving section due to pressure reduction in the first space.

The liquid ejection device for solving the above-described problem includes the valve mechanism of the above-described configuration, a liquid ejection section configured to eject liquid, the flow path, which is for supplying the liquid to the liquid ejection section, and a decompression source, wherein the first lid member has a first communication hole for communicating between the decompression source and the first space, and the decompression source is configured to reduce pressure in the first space via the first communication hole.

The valve mechanisms for solving the above-described problem are provided in each of a plurality of flow paths through which plural types of fluid flows, and they include a base on which a part of each of the plurality of flow paths is formed, a plurality of valve sections configured to close respective ones of the plurality of flow paths, respectively, a pressure receiving section having flexibility, a first lid member that forms a first space between the first lid member and the pressure receiving section, and a lever section provided in the first space, wherein the lever section pushes the plurality of valve sections in a direction of closing the plurality of flow paths based on displacement of a pressure receiving section due to pressure reduction in the first space.

The liquid ejection device for solving the above-described problem includes the valve mechanism of the above-described configuration, a liquid ejection section configured to eject plural types of liquid, a plurality of flow paths that supplies the plural types of liquid to the liquid ejection section, and a decompression source, wherein the first lid member has a first communication hole for communicating between the decompression source and the first space, and the decompression source is configured to reduce pressure in the first space via the first communication hole.

A control method of a liquid ejection device that solves the above-described problem, and the liquid ejection device has a liquid ejection section configured to eject liquid, a flow path that supplies the liquid to the liquid ejection section, a decompression source, a base on which a part of the flow path is formed, a valve section configured to close the flow path, a pressure receiving section having flexibility, a first lid member that forms a first space between the first lid member and the pressure receiving section, a lever section provided in the first space, a liquid chamber provided between the valve section and the liquid ejection section in the flow path, at least a part of the liquid chamber being constituted by a flexible member having flexibility, a biasing member configured to bias the flexible member in a direction in which volume of the liquid chamber decreases, a second lid member that forms a second space between the second lid member and the flexible member, and an atmospheric communication section configured to communicate the inside of the second space to atmosphere, the control method for a liquid ejection device includes drawing the liquid into the liquid chamber by displacing the flexible member in a direction in which volume of the liquid chamber increases by depressurizing the inside of the second space by the decompression source; displacing the pressure receiving section by depressurizing the inside of the first space by the decompression source, closing a part of the flow path by the lever section pushing the valve section based on displacement of the pressure receiving section, and pushing the flexible member with biasing force of the biasing member to push the liquid in the liquid chamber toward the liquid ejection section by causing the inside of the second space to communicate with atmosphere via the atmospheric communication section.

A control method of a liquid ejection device that solves the above-described problem, and the liquid ejection device has a liquid ejection section configured to eject plural types of liquid, a plurality of flow paths that supplies the plural types of liquid to the liquid ejection section, a decompression source, a base on which a part of each of the plurality of flow paths is formed, a plurality of valve sections configured to close the plurality of flow paths, a pressure receiving section having flexibility, a first lid member that forms a first space between the first lid member and the pressure receiving section, a lever section provided in the first space, a plurality of liquid chambers provided between the valve section and the liquid ejection section in the plurality of flow paths, and at least a part of which is configured by a flexible member having flexibility, a plurality of biasing members configured to bias the flexible member in a direction in which volume of the plurality of liquid chambers decreases, a second lid member configured to form a plurality of second spaces between the second lid member and the flexible member at positions corresponding to the plurality of liquid chambers, and an atmospheric communication section configured to communicate the inside of the plurality of second spaces to atmosphere, the control method for a liquid ejection device includes drawing the liquid into the plurality of liquid chambers by displacing the flexible member in a direction in which volume of the plurality of liquid chambers increases by depressurizing the inside of the plurality of second space by the decompression source; displacing the pressure receiving section by depressurizing the inside of the first space by the decompression source, closing a part of each of the plurality of flow paths by causing the lever section pushing the plurality of valve sections based on displacement of the pressure receiving section, and pushing out the liquid in the plurality of liquid chambers toward the liquid ejection section by pushing the flexible member with the biasing force of the plurality of biasing members by causing the inside of the plurality of second spaces to communicate with atmosphere by the atmospheric communication section.

DESCRIPTION OF EMBODIMENTS

First Embodiment

Hereinafter, a first embodiment of a valve mechanism, a liquid ejection device, and a method of controlling the liquid ejection device will be described with reference to the drawings. The liquid ejection device is, for example, an inkjet type printer that performs printing by ejecting ink that is an example of the liquid onto a medium such as paper sheet, fabric, vinyl, a plastic component, or a metal component.

Liquid Ejection Device

Figure 1:
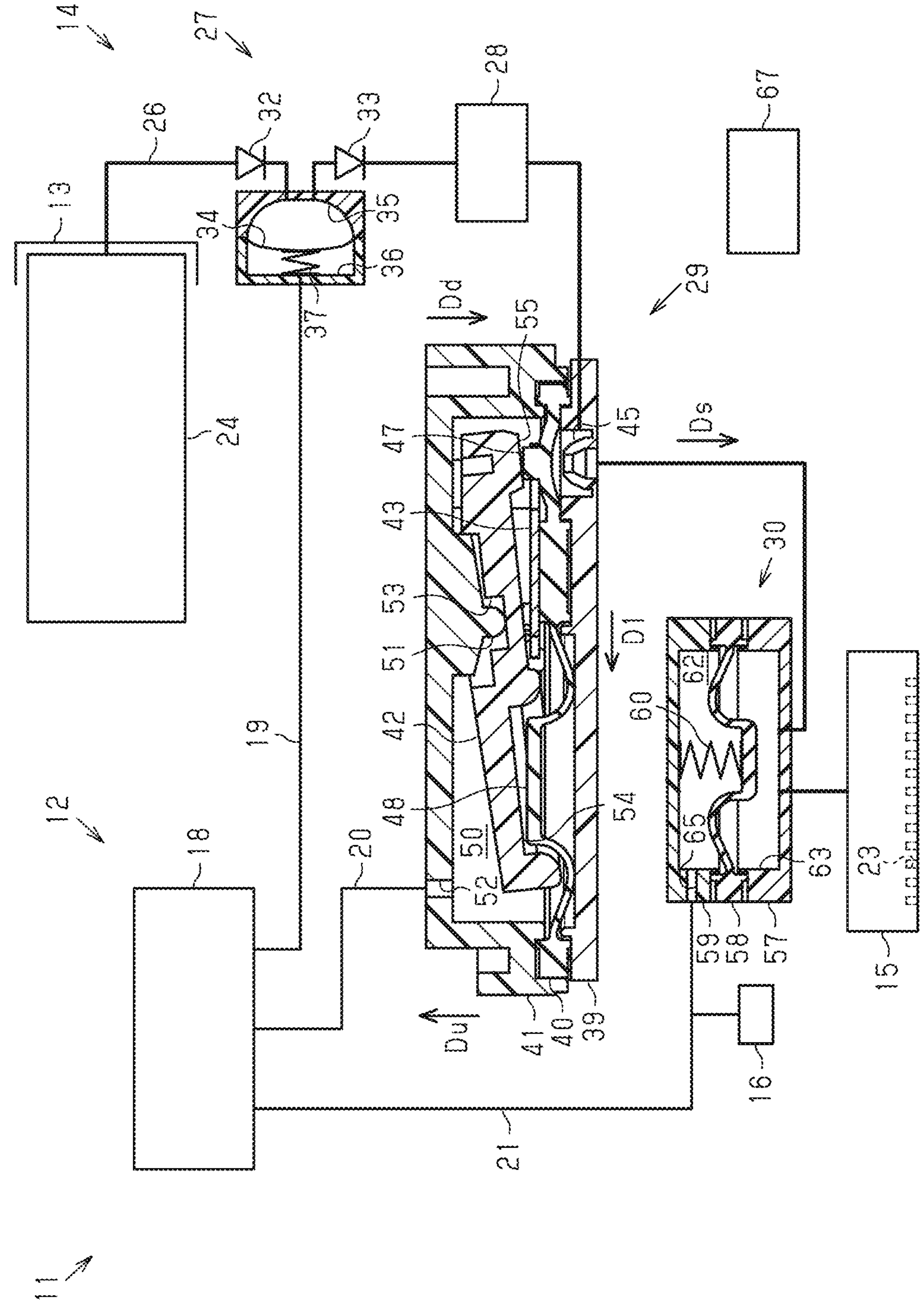
FIG. 1 is a schematic diagram of a first embodiment of a liquid ejection device.

As shown in FIG. 1, a liquid ejection device 11 may include a decompression section 12, a mount section 13, and a supply mechanism 14. The liquid ejection device 11 may include a liquid ejection section 15 and an atmospheric communication section 16.

The decompression section 12 may include a decompression source 18, a first decompression path 19, a second decompression path 20, and a third decompression path 21. Each of the first decompression path 19, the second decompression path 20, and the third decompression path 21 are coupled to the decompression source 18 and the supply mechanism 14.

The liquid ejection section 15 is configured to eject liquid. The liquid ejection section 15 performs printing on a medium (not illustrated) by ejecting liquid from a plurality of nozzles 23.

The mount section 13 is configured such that a liquid container 24 containing liquid is mounted thereon. The liquid container 24 may be a cartridge, a pack, or the like, or may be a tank which can be replenished liquid.

Supply Mechanism

The supply mechanism 14 may include a flow path 26, a feed pump 27, an adjustment section 28, a valve mechanism 29, and a pressurizing section 30. The supply mechanism 14 supplies the liquid contained in the liquid container 24 to the liquid ejection section 15.

Liquid flows through the flow path 26. The liquid of the present embodiment is an example of a fluid. The flow path 26 supplies liquid to the liquid ejection section 15. The liquid flows through the flow path 26 in the supply direction Ds. An upstream end of the flow path 26 is coupled to the liquid container 24 mounted on the mount section 13. A downstream end of the flow path 26 is coupled to the liquid ejection section 15. The feed pump 27, the adjustment section 28, the valve mechanism 29, and the pressurizing section 30 are provided in the flow path 26.

Feed Pump

The feed pump 27 supplies the liquid toward the liquid ejection section 15. The feed pump 27 may include a first one-way valve 32, a second one-way valve 33, a displacement section 34, a pump chamber 35, a pressure chamber 36, and a spring 37.

The first one-way valve 32 is provided upstream of the pump chamber 35 in the supply direction Ds. The second one-way valve 33 is provided downstream of the pump chamber 35 in the supply direction Ds. The first one-way valve 32 and the second one-way valve 33 allow the liquid flow downstream in the supply direction Ds. The first one-way valve 32 and the second one-way valve 33 restrict the liquid flow toward upstream in the supply direction Ds.

The displacement section 34 separates the pump chamber 35 from the pressure chamber 36. The displacement section 34 may have flexibility. The displacement section 34 changes the volume of the pump chamber 35 by being deformed according to the difference in pressure between the pump chamber 35 and the pressure chamber 36.

The spring 37 is provided in the pressure chamber 36. The spring 37 pushes the displacement section 34 in a direction to reduce the volume of the pump chamber 35.

The first decompression path 19 couples the decompression source 18 and the pressure chamber 36. The decompression source 18 can depressurize the pressure chamber 36. The decompression source 18 increases the volume of the pump chamber 35 by depressurizing the pressure chamber 36. When the volume of the pump chamber 35 increases, the feed pump 27 draws the liquid from the liquid container 24. When the decompression source 18 releases the decompression of the pressure chamber 36, the spring 37 pushes the displacement section 34. The spring 37 pushes out the fluid in the pump chamber 35 by reducing the volume of the pump chamber 35.

The decompression source 18 drives the feed pump 27 by alternately reducing the pressure in the pressure chamber 36 and canceling the decompression. The decompression source 18 may drive the feed pump 27 while the liquid ejection device 11 is operating.

Adjustment Section

The adjustment section 28 adjusts the pressure of the liquid supplied to the liquid ejection section 15. The adjustment section 28 sets the pressure of the liquid downstream of the adjustment section 28 to a predetermined negative pressure. The adjustment section 28 restricts the liquid passage when the differential pressure between the downstream pressure and the atmospheric pressure is small. When the differential pressure between the downstream pressure and the atmospheric pressure increases, the adjustment section 28 allows the liquid to pass through.

Valve Mechanism

The valve mechanism 29 may include a first base 39 which is an example of a base, a first flexible member 40, a first lid member 41, a lever section 42, and a pressing member 43.

A part of the flow path 26 is formed in the first base 39. The first base 39 may have a valve seat 45.

The first flexible member 40 may include a valve section 47 and a pressure receiving section 48. The valve section 47 in the present embodiment is formed integrally with the pressure receiving section 48. The valve section 47 may have flexibility. The valve section 47 in the present embodiment has elasticity. The pressure receiving section 48 has flexibility. The valve section 47 and the pressure receiving section 48 are arranged side by side in the longitudinal direction D1 of the lever section 42.

The first flexible member 40 and the pressing member 43 are sandwiched between the first base 39 and the first lid member 41. The pressing member 43 is positioned between the lever section 42 and the first flexible member 40. The pressing member 43 presses the first flexible member 40.

A first space 50 is formed between the first lid member 41 and the first flexible member 40. In other words, the first lid member 41 forms the first space 50 between itself and the valve section 47. The first space 50 is formed between the first lid member 41 and the pressure receiving section 48.

The first lid member 41 may include a column 51. The column 51 is located in the first space 50. The column 51 is located on the opposite side of the first flexible member 40 with respect to the lever section 42. The column 51 is positioned between the pressure receiving section 48 and the valve section 47 in the longitudinal direction D1.

The first lid member 41 has a first communication hole 52. The first communication hole 52 communicates the decompression source 18 with the first space 50. The communication refers to the connection in a state in which a fluid such as a liquid or a gas can flow. The second decompression path 20 is coupled to the first communication hole 52 in the present embodiment. The first communication hole 52 communicates with the decompression source 18 via the second decompression path 20. The decompression source 18 can reduce the pressure in the first space 50 via the first communication hole 52.

A space may be formed between the pressure receiving section 48 and the first base 39. The space between the pressure receiving section 48 and the first base 39 may communicate with atmosphere.

The pressure receiving section 48 is more easily deformed than the valve section 47. For example, the thickness of the pressure receiving section 48 is thinner than the thickness of the valve section 47. The pressure receiving section 48 and the valve section 47 may be circular in a plan view. The diameter of the pressure receiving section 48 is larger than that of the valve section 47. The area of the pressure receiving section 48 on which the pressure of the first space 50 acts is larger than the area of the valve section 47 on which the pressure of the first space 50 acts.

The valve section 47 can close the flow path 26. A part of the flow path 26 is formed between the valve section 47 and the first base 39. The valve section 47 faces the valve seat 45. The valve section 47 is positioned at an open position shown in FIG. 1 away from the valve seat 45 to open the flow path 26. The valve section 47 closes the flow path 26 by being positioned at a closed position (not shown) in contact with the valve seat 45.

The lever section 42 is provided in the first space 50. The lever section 42 includes a fulcrum section 53, a first passive section 54, and a second passive section 55. The fulcrum section 53 is located between the first passive section 54 and the second passive section 55 in the longitudinal direction D1. The fulcrum section 53 is positioned between the pressure receiving section 48 and the valve section 47 in the longitudinal direction D1. The fulcrum section 53 in the present embodiment is a bottomed hole. The bottom of the fulcrum section 53 is in contact with the tip end of the column 51. The lever section 42 can swing so that the inclination with respect to the longitudinal direction D1 changes with the tip end of the column 51 as a fulcrum.

The first passive section 54 is located opposite side to the second passive section 55 in the longitudinal direction D1. The first passive section 54 is contactable with the pressure receiving section 48. The second passive section 55 is contactable with the valve section 47. The first passive section 54 and the second passive section 55 are movable in the pushing-up direction Du and the pushing-down direction Dd, respectively. The pushing-up direction Du is a direction opposite to the pushing-down direction Dd. The second passive section 55 is displaced in a direction opposite to the first passive section 54.

Pressurizing Section

The pressurizing section 30 may include a second base 57, a second flexible member 58 which is an example of a flexible member, a second lid member 59, and a biasing member 60. The second flexible member 58 has flexibility.

The second flexible member 58 is sandwiched between the second base 57 and the second lid member 59. A second space 62 is formed between the second lid member 59 and the second flexible member 58. A liquid chamber 63 is formed between the second flexible member 58 and the second base 57. In other words, the pressurizing section 30 includes the liquid chamber 63.

The biasing member 60 is, for example, a spring. The biasing member 60 is provided in the second space 62. The biasing member 60 biases the second flexible member 58 in a direction in which volume of the liquid chamber 63 decreases. The biasing refers to pushing back an object when a force is applied to the object.

At least a part of the liquid chamber 63 is constituted by the second flexible member 58. The liquid chamber 63 constitutes a part of the flow path 26. The liquid chamber 63 is provided between the valve mechanism 29 and the liquid ejection section 15 in the flow path 26.

The second lid member 59 is provided with a second communication hole 65. The second communication hole 65 communicates the decompression source 18 with the second space 62. The third decompression path 21 is coupled to the second communication hole 65 in the present embodiment. The second communication hole 65 communicates with the decompression source 18 via the third decompression path 21. The decompression source 18 can reduce the pressure in the second space 62 via the second communication hole 65.

The atmospheric communication section 16 may be coupled to the third decompression path 21. The atmospheric communication section 16 may cause the second space 62 to communicate with atmosphere via the third decompression path 21. The atmospheric communication section 16 can communicate the inside of the second space 62 with atmosphere.

The liquid ejection device 11 includes a control section 67. The control section 67 integrally controls the driving of each mechanism in the liquid ejection device 11. The control section 67 controls various operations performed in the liquid ejection device 11.

The control section 67 can be configured as a circuit including α: one or more processors that execute various processes in accordance with a computer program, β: one or more dedicated hardware circuits that execute at least some of the various processes, or γ: a combination thereof. The hardware circuit is, for example, an application-specific integrated circuit (ASIC). The processor includes a CPU and memory, such as RAM and ROM, and the memory stores program code or commands configured to cause the CPU to perform processes. Memory, in other words, a computer-readable medium, includes any readable medium that can be accessed by a general purpose or special purpose computer.

Method for Controlling Liquid Ejection Device

The control section 67 performs the pressurized cleaning by controlling the driving of the decompression source 18 and the atmospheric communication section 16. The pressurized cleaning is maintenance that causes the liquid to overflow from the nozzle 23 by supplying the pressurized liquid to the liquid ejection section 15.

When the pressurized cleaning is performed, first, the control section 67 depressurizes the inside of the second space 62 by the decompression source 18. When the pressure in the second space 62 is reduced, the second flexible member 58 is displaced in a direction in which the volume of the liquid chamber 63 increases. At this time, the valve section 47 is located at the open position. Therefore, the pressurizing section 30 draws the liquid into the liquid chamber 63.

Subsequently, the control section 67 causes the decompression source 18 to reduce the pressure in the first space 50. The control section 67 displaces the pressure receiving section 48 by depressurizing the inside of the first space 50. The pressure receiving section 48 is displaced so as to reduce the volume of the first space 50.

The displaced pressure receiving section 48 moves the first passive section 54 in the pushing-up direction Du. At this time, the second passive section 55 moves in the pushing-down direction Dd. The second passive section 55 pushes the valve section 47. The valve section 47 moves to the closed position. In other words, the valve mechanism 29 causes the lever section 42 to press the valve section 47 based on displacement of the pressure receiving section 48 to close a part of the flow path 26.

The control section 67 causes the inside of the second space 62 to communicate with atmosphere by the atmospheric communication section 16. The control section 67 pushes the second flexible member 58 by the biasing force of the biasing member 60 by causing the inside of the second space 62 to communicate with atmosphere. At this time, the valve section 47 closes the flow path 26. Therefore, the biasing member 60 pushes out the liquid in the liquid chamber 63 toward the liquid ejection section 15. As a result, the liquid overflows from the nozzle 23. In other words, the increased viscosity liquid, foreign matter, and the like are discharged from the nozzle 23. The control section 67 may perform wiping in which a wiper (not illustrated) wipes the liquid ejection section 15.

The control section 67 releases the depressurization in the first space 50. When the depressurization of the first space 50 is released, the force with which the pressure receiving section 48 presses the lever section 42 decreases. The valve section 47 located at the closed position is moved to the open position by elasticity. The valve section 47 opens the flow path 26. The valve section 47 pushes the second passive section 55 in the pushing-up direction Du. When the second passive section 55 moves in the pushing-up direction Du, the lever section 42 pushes the pressure receiving section 48 in the pushing-down direction Dd through the first passive section 54. The pressure receiving section 48 is displaced so as to increase the volume of the first space 50.

Operation of First Embodiment

The operation of the present embodiment will be described.

When the decompression source 18 depressurizes the first space 50, the pressure receiving section 48 is displaced. The lever section 42 presses the valve section 47 in a direction of closing the flow path 26 based on displacement of the pressure receiving section 48 due to pressure reduction in the first space 50. When the depressurization in the first space 50 is released, the valve section 47 opens the flow path 26.

Effects of First Embodiment

Effects of the present embodiment will be described.

1-1: The pressure receiving section 48 is displaced by pressure reduction in the first space 50. The lever section 42 closes the flow path 26 by pressing the valve section 47 based on displacement of the pressure receiving section 48. In a case where the first space 50 is depressurized, the adhesion between the pressure receiving section 48 and the first lid member 41 is less likely to decrease than in a case where the first space 50 is pressurized. Therefore, the occurrence of leakage can be suppressed.

1-2: When the decompression source 18 depressurizes the second space 62, the second flexible member 58 is displaced so as to increase the volume of the liquid chamber 63. The liquid chamber 63 draws in the liquid as its volume increases. When the atmospheric communication section 16 causes the second space 62 to communicate with atmosphere, the second flexible member 58 is displaced so as to reduce the volume of the liquid chamber 63 by the biasing force of the biasing member 60 and pushes out the liquid from the liquid chamber 63. Therefore, the liquid can be pressurized and supplied to the liquid ejection section 15 by the decompression source 18 which closes the flow path 26.

Second Embodiment

Next, a second embodiment of the liquid ejection device will be described with reference to the drawings. The second embodiment is different from the first embodiment in that a plurality of flow paths are provided. In other respects, the second embodiment is substantially the same as the first embodiment, so the same components are denoted by the same reference numerals, and redundant description thereof will be omitted.

Figure 2:
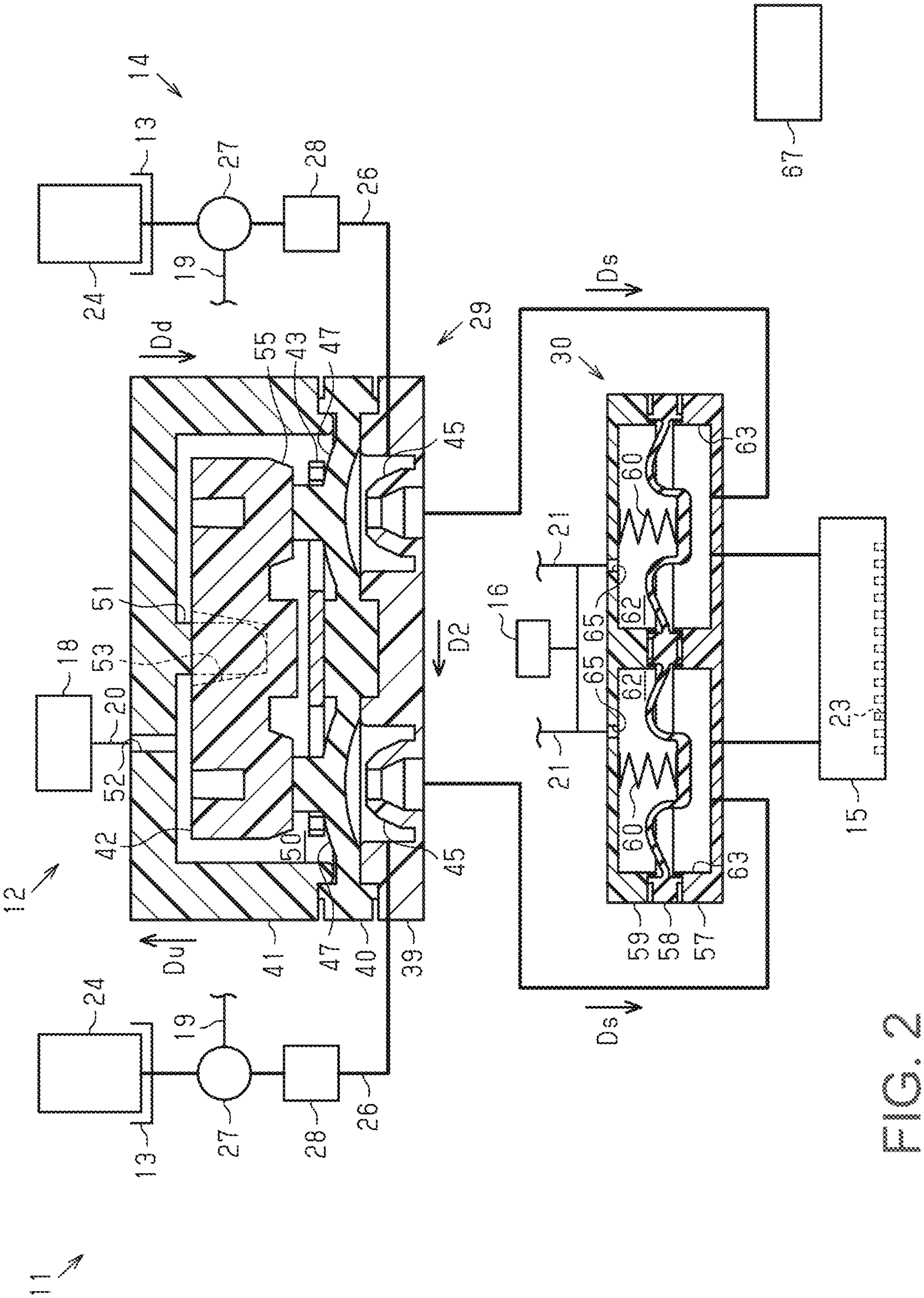
FIG. 2 is a schematic diagram of a second embodiment of a liquid ejection device.

As shown in FIG. 2, the liquid ejection device 11 may include a plurality of flow paths 26. The plurality of flow paths 26 may be coupled to the different liquid containers 24. One or more liquid containers 24 may be mountable on the mount section 13. The liquid ejection device 11 may include a plurality of mount sections 13. The plurality of liquid containers 24 may contain different types of liquids.

Plural types of fluid flow respectively flow through the plurality of flow paths 26. The plurality of flow paths 26 supplies plural types of liquid to the liquid ejection section 15. The liquid ejection section 15 ejects plural types of liquid.

Each of the plurality of flow paths 26 is provided with the feed pump 27 and an adjustment section 28. The liquid ejection device 11 includes a plurality of feed pumps 27 and a plurality of adjustment sections 28. The liquid ejection device 11 may include one valve mechanism 29 and one pressurizing section 30 for the plurality of flow paths 26. The valve mechanism 29 and the pressurizing section 30 of the present embodiment are provided in the plurality of flow paths 26.

Valve Mechanism

As shown in FIG. 2, a part of each of the plurality of flow paths 26 is formed in the first base 39. The first base 39 may include a plurality of valve seats 45.

The first flexible member 40 may include a plurality of valve sections 47. The plurality of valve sections 47 may be arranged in the transverse direction D2 of the lever section 42. A plurality of valve sections 47 are provided in each of the plurality of flow paths 26. The plurality of valve sections 47 can close each of the plurality of flow paths 26.

Figure 3:
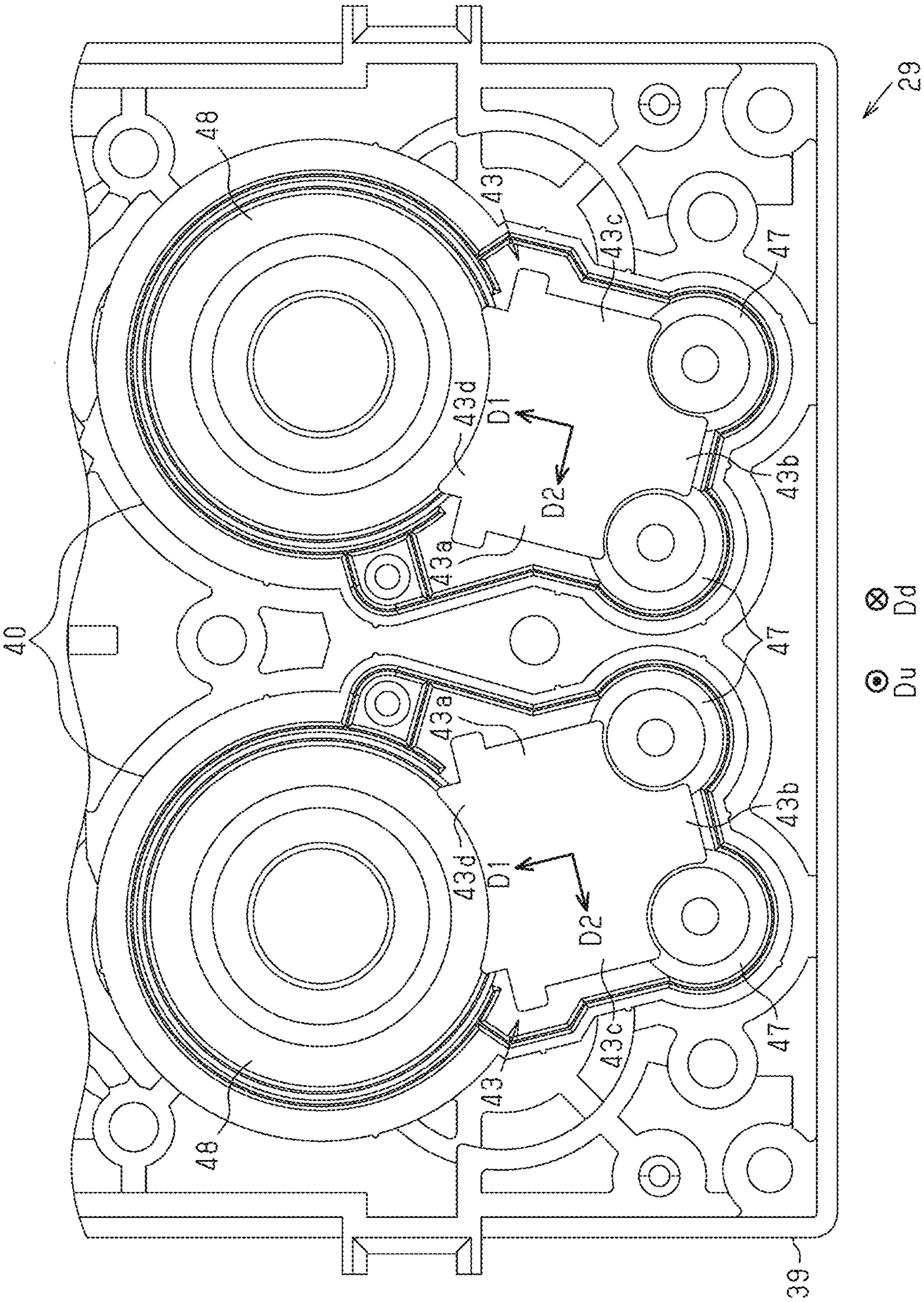
FIG. 3 is a plan view of the first base and the first flexible member.

As shown in FIG. 3, the first flexible member 40 may have one pressure receiving section 48 and a plurality of valve sections 47. The valve mechanism 29 may include a plurality of first flexible members 40. The first flexible member 40 in the present embodiment includes one pressure receiving section 48 and two valve sections 47. The area of one pressure receiving section 48 on which the pressure of the first space 50 acts is larger than the sum of the areas of the two valve sections 47 on which the pressure of the first space 50 acts.

The valve mechanism 29 may include a plurality of pressing members 43. The pressing member 43 has a first edge section 43*a*, a second edge section 43*b*, a third edge section 43*c*, and a fourth edge section 43*d*.

The first edge section 43*a*, the third edge section 43*c*, and the fourth edge section 43*d* are positioned between the pressure receiving section 48 and the valve section 47 in the longitudinal direction D1. The first edge section 43*a* and the third edge section 43*c* extend linearly in the longitudinal direction D1. The second edge section 43*b* is positioned between the plurality of valve sections 47 in the transverse direction D2. The second edge section 43*b* extends linearly in the transverse direction D2. The fourth edge section 43*d* extends in an arcuate along the edge of the pressure receiving section 48.

Figure 4:
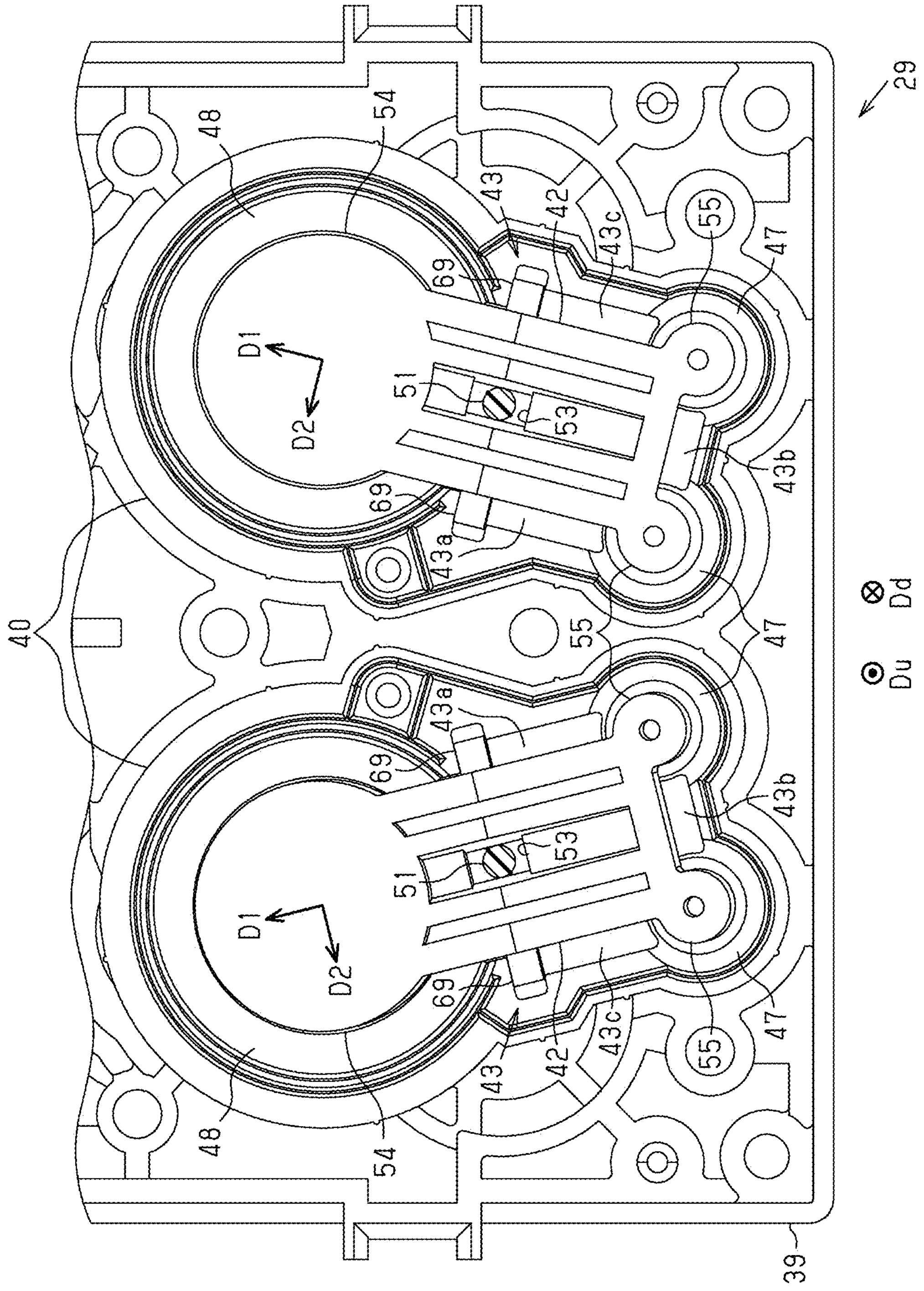
FIG. 4 is a plan view of the first base body, the first flexible member, and the lever section.

As shown in FIG. 4, the first edge section 43*a*, the second edge section 43*b*, and the third edge section 43*c* are positioned outer side of the lever section 42. The first lid member 41 presses the first edge section 43*a*, the second edge section 43*b*, and the third edge section 43*c*. The first lid member 41 presses the outer periphery of the first flexible member 40 and presses the pressing member 43. The first lid member 41 presses the inner side of the first flexible member 40 via the pressing member 43.

The valve mechanism 29 may include a plurality of lever sections 42. The valve mechanism 29 may include a plurality of columns 51. Each of the plurality of lever sections 42 can swing so that the inclination with respect to the longitudinal direction D1 changes with the tip end of each column 51 as a fulcrum.

The lever section 42 may include one or more positioning sections 69. The positioning section 69 restricts movement of the lever section 42 in the longitudinal direction D1.

As shown in FIG. 2, the fulcrum section 53 may be positioned at the center of the lever section 42 in the transverse direction D2. The lever section 42 can swing so that the inclination with respect to the transverse direction D2 changes with the tip end of the column 51 as a fulcrum. When the positions of the plurality of valve sections 47 in the pushing-up direction Du are different, the lever section 42 is inclined following the plurality of valve sections 47.

Pressurizing Section

As shown in FIG. 2, the second lid member 59 forms a plurality of second spaces 62 with the second flexible member 58. A plurality of liquid chambers 63 are formed between the second flexible member 58 and the second base 57. In other words, the pressurizing section 30 includes the plurality of liquid chambers 63. The plurality of second spaces 62 are formed at positions corresponding to the plurality of liquid chambers 63, respectively.

The pressurizing section 30 includes a plurality of biasing members 60. Each of the plurality of biasing members 60 is provided in the second space 62, respectively. Each of the plurality of biasing members 60 biases the second flexible member 58 in a direction in which volume of the liquid chamber 63 decreases.

At least a part of each of liquid chamber 63 is constituted by the second flexible member 58. Each of the plurality of liquid chambers 63 constitutes a part of a different flow path 26. Each of the liquid chamber 63 is provided between the valve mechanism 29 and the liquid ejection section 15 in each of the flow paths 26.

The second lid member 59 is provided with a plurality of second communication holes 65. The second communication hole 65 communicates the decompression source 18 with the second space 62. The atmospheric communication section 16 can communicate the inside of the plurality of second spaces 62 with atmosphere.

Method for Controlling Liquid Ejection Device

As shown in FIG. 2, when the pressurized cleaning is performed, first, the control section 67 depressurizes the inside of the plurality of second spaces 62 by the decompression source 18. The control section 67 may select the second space 62 corresponding to the nozzle 23 which performs the pressurized cleaning among the plurality of second spaces 62 and decompress the selected second space 62. When the pressure in the second space 62 is reduced, the portion of the second flexible member 58 that separates the second space 62 from the liquid chamber 63 is displaced in a direction in which the volume of the liquid chamber 63 increases. At this time, the plurality of valve sections 47 are positioned at the open position. Therefore, the pressurizing section 30 draws the liquid into one or more liquid chambers 63.

As shown in FIGS. 1 and 2, subsequently, the control section 67 depressurizes the inside of the first space 50 by the decompression source 18. The control section 67 displaces the pressure receiving section 48 by reducing the pressure in the first space 50. The pressure receiving section 48 is displaced so as to reduce the volume of the first space 50.

The displaced pressure receiving section 48 moves the first passive section 54 in the pushing-up direction Du. At this time, the second passive section 55 moves in the pushing-down direction Dd. The second passive section 55 pushes the plurality of valve sections 47. The plurality of valve sections 47 move to the closed position. In other words, based on displacement of the pressure receiving section 48, the valve mechanism 29 causes the lever section 42 to press the plurality of valve sections 47 to close a part of each of the plurality of flow paths 26.

As shown in FIG. 2, the control section 67 causes the inside of the plurality of second spaces 62 to communicate with atmosphere by the atmospheric communication section 16. The control section 67 pushes the second flexible member 58 by the biasing force of the plurality of biasing members 60 by making the inside of the second space 62 communicate with atmosphere. At this time, the plurality of valve sections 47 close the respective flow paths 26. Therefore, the plurality of biasing members 60 push out the liquid in the plurality of liquid chambers 63 toward the liquid ejection section 15. As a result, the liquid overflows from the nozzle 23. In other words, the increased viscosity liquid, foreign matter, and the like are discharged from the nozzle 23. The control section 67 may perform wiping in which a wiper (not illustrated) wipes the liquid ejection section 15.

The control section 67 releases the depressurization in the first space 50. When the depressurization of the first space 50 is released, the force with which the pressure receiving section 48 presses the lever section 42 decreases. The plurality of valve sections 47 positioned at the closed position are moved to the open position by elasticity. The plurality of valve sections 47 push the lever section 42 in the pushing-up direction Du. In the lever section 42, where the second passive section 55 is pressed by the valve section 47, the first passive section 54 presses the pressure receiving section 48 in the pushing-down direction Dd. The pressure receiving section 48 is displaced so as to increase the volume of the first space 50.

Operation of Second Embodiment

The operation of the present embodiment will be described.

When the decompression source 18 depressurizes the first space 50, the pressure receiving section 48 is displaced. The lever section 42 presses the plurality of valve sections 47 in a direction in which the plurality of flow paths 26 are closed based on displacement of the pressure receiving section 48 due to pressure reduction in the first space 50. When the depressurization in the first space 50 is released, the plurality of valve sections 47 opens the plurality of flow paths 26.

Effects of Second Embodiment

Effects of the present embodiment will be described.

2-1: A plurality of flow paths 26 can be closed by one lever section 42. Therefore, the configuration can be simplified as compared with a case where the same number of lever sections 42 as the plurality of valve sections 47 are provided.

Modified Example

The present embodiment can be implemented with the following modifications. The present embodiment and the following modified example can be implemented in combination with each other as long as there is no technical contradiction.

The valve section 47 and the pressure receiving section 48 may be formed of separate members.

The valve section 47 may be, for example, a piston with no flexibility.

The valve mechanism 29 may include a spring that pushes the valve section 47 located at the closed position toward the open position.

One of the second base 57 and the second lid member 59 may be formed integrally with the first base 39.

One of the second base 57 and the second lid member 59 may be formed integrally with the first lid member 41.

The decompression section 12 may be configured not to include at least one of the first decompression path 19, the second decompression path 20, and the third decompression path 21. The decompression source 18 may, for example, be directly provided in the first communication hole 52.

The liquid ejection device 11 may release the depressurization in the first space 50 by sending air into the first space 50. The liquid ejection device 11 may release the depressurization in the first space 50 by allowing the inside of the first space 50 to communicate with atmosphere. The atmospheric communication section 16 may allow the inside of the first space 50 to communicate with atmosphere.

The first lid member 41 may not have the first communication hole 52. For example, the valve mechanism 29 may sandwich a member constituting the second decompression path 20 between the first lid member 41 and the first flexible member 40.

The second lid member 59 may not have the second communication hole 65. For example, the pressurizing section 30 may sandwich a member constituting the third decompression path 21 between the second lid member 59 and the second flexible member 58.

The first flexible member 40 may include a plurality of pressure receiving sections 48 and a plurality of valve sections 47. In the second embodiment, the two first flexible members 40 may be integrally formed.

The valve mechanism 29 may be provided in the flow path through which the gas flows. For example, the valve mechanism 29 may be provided in at least one of the first decompression path 19, the second decompression path 20, and the third decompression path 21.

The liquid ejection device 11 may include a plurality of valve mechanisms 29. The plurality of valve mechanisms 29 may be provided in the plurality of flow paths 26, respectively.

The liquid ejection device 11 may include a plurality of pressurizing sections 30. The plurality of pressurizing sections 30 may be provided in the plurality of flow paths 26, respectively.

The liquid ejection device 11 may be a liquid ejection device that ejects or discharges other than ink. The state of the liquid which is ejected from the liquid ejection device in the form of a minute amount of droplet includes a granular shape, a tear shape, and a shape with a thread-like tail. Here, the liquid may refer to be material that can be ejected from the liquid ejection device. For example, the liquid may be in a state where a substance is in a liquid phase and includes a fluid body such as a liquid body having high or low viscosity, a sol, gel water, other inorganic solvents, an organic solvent, a solution, a liquid resin, a liquid metal, and a metal melt. The liquid includes not only a liquid as one state of a substance but also a liquid in which particles of a functional material made of a solid material such as a pigment or metal particles are dissolved, dispersed, or mixed in a solvent. Typical examples of liquid include ink and liquid crystal as described in the above embodiment. Here, the ink includes various liquid compositions such as general water-based ink, oil-based ink, gel ink, and hot-melt ink and the like. As a specific example of the liquid ejection device, there is an apparatus that ejects a liquid containing a material such as an electrode material or a color material used for manufacturing a liquid crystal display, an electroluminescence display, a surface emitting display, a color filter, or the like in a dispersed or dissolved form. The liquid ejection device may be a device that ejects a bio-organic substance used for manufacturing a biochip, a device that is used as a precision pipette and ejects a sample liquid, a textile printing device, a micro dispenser, or the like. The liquid ejection device may be a device that ejects lubricating oil in a pinpoint manner to precision machines such as watches or cameras, or a device that ejects a transparent resin such as an ultraviolet curable resin onto a substrate to form micro hemispherical lenses, optical lenses, or the like used in optical communication elements. The liquid ejection device may be a device that ejects an etchant liquid such as an acid or an alkali for etching a substrate or the like.

Definitions

As used herein, the phrase "at least one" means "one or more" of the desired alternatives. As an example, the phrase "at least one" as used herein means "only one option" or "both of two options" if the number of options is two. As another example, as used herein, the phrase "at least one" means "only one option", "a combination of two options", or "a combination of three or more options" if the number of options is three or more.

Notes

Hereinafter, technical ideas grasped from the above-described embodiment and modified example, and operational effects thereof will be described.

(A) The valve mechanism is provided in a flow path through which a fluid flows, and it includes a base on which a part of the flow path is formed, a valve section configured to close the flow path, a pressure receiving section having flexibility, a first lid member that forms a first space between the first lid member and the pressure receiving section, a lever section provided in the first space, wherein the lever section pushes the valve section in a direction of closing the flow path based on displacement of the pressure receiving section due to pressure reduction in the first space.

According to this configuration, the pressure receiving section is displaced by pressure reduction in the first space. The lever section closes the flow path by pressing the valve section based on displacement of the pressure receiving section. In a case where the first space is depressurized, the adhesion between the pressure receiving section and the first lid member is less likely to decrease than in a case where the first space is pressurized. Therefore, the occurrence of leakage can be suppressed.

(B) A liquid ejection device includes the valve mechanism of the above-described configuration, a liquid ejection section configured to eject liquid, the flow path, which is for supplying the liquid to the liquid ejection section, and a decompression source, wherein the first lid member has a first communication hole for communicating between the decompression source and the first space, and the decompression source may be configured to reduce pressure in the first space via the first communication hole.

According to this configuration, it is possible to achieve the same effect as that of the above-described valve mechanism.

(C) The liquid ejection device may further include a liquid chamber provided in the flow path between the valve mechanism and the liquid ejection section, at least a part of which is constituted by a flexible member having flexibility, a biasing member configured to bias the flexible member in a direction in which volume of the liquid chamber decreases, a second lid member that forms a second space between the second lid member and the flexible member and is provided with a second communication hole for communicating the decompression source with the second space, and an atmospheric communication section configured to communicate the inside of the second space to atmosphere.

According to this configuration, when the decompression source reduces the pressure in the second space, the flexible member is displaced so as to increase the volume of the liquid chamber. The liquid chamber draws in the liquid as its volume increases. When the atmospheric communication section causes the second space to communicate with atmosphere, the flexible member is displaced so as to reduce the volume of the liquid chamber by the biasing force of the biasing member and pushes out the liquid from the liquid chamber. Therefore, the liquid can be pressurized and supplied to the liquid ejection section by the decompression source that closes the flow path.

(D) The valve mechanisms that provided in a plurality of flow paths through which plural types of fluid flows flow, and each valve mechanism includes a base on which a part of each of the plurality of flow paths is formed, a plurality of valve sections configured to close respective ones of the plurality of flow paths, respectively, a pressure receiving section having flexibility, a first lid member that forms a first space between the first lid member and the pressure receiving section, a lever section provided in the first space, wherein the lever section pushes the plurality of valve sections in a direction of closing the plurality of flow paths based on displacement of a pressure receiving section due to pressure reduction in the first space.

According to this configuration, in addition to the same effect as the above-described valve mechanism, a plurality of flow paths can be closed by one lever section. Therefore, the configuration can be simplified as compared with a case where the same number of lever sections as the plurality of valve sections are provided.

(E) A liquid ejection device includes the valve mechanism of the above-described configuration, a liquid ejection section configured to eject plural types of liquid, a plurality of flow paths that supplies the plural types of liquid to the liquid ejection section, and a decompression source, wherein the first lid member has a first communication hole for communicating between the decompression source and the first space, and the decompression source may be configured to reduce pressure in the first space via the first communication hole.

According to this configuration, it is possible to achieve the same effect as that of the above-described valve mechanism.

(F) The liquid ejection device may further include a plurality of liquid chambers provided between the valve mechanism and the liquid ejection section in the plurality of flow paths, at least a part of which is configured by a flexible member having flexibility, a plurality of biasing members configured to bias the flexible member in a direction in which volume of the plurality of liquid chambers decreases, a second lid member that forms a plurality of second spaces between the second lid member and the flexible member at positions corresponding to the plurality of liquid chambers and that is provided with a plurality of second communication holes for communicating the decompression source with the plurality of second spaces, and an atmospheric communication section configured to communicate the inside of the plurality of second spaces to atmosphere.

According to this configuration, it is possible to achieve the same effects as the above-described liquid ejection device.

(G) A method of controlling a liquid ejection device that has a liquid ejection section configured to eject liquid, a flow path that supplies the liquid to the liquid ejection section, a decompression source, a base on which a part of the flow path is formed, a valve section configured to close the flow path, a pressure receiving section having flexibility, a first lid member that forms a first space between the first lid member and the pressure receiving section, a lever section provided in the first space, a liquid chamber provided between the valve section and the liquid ejection section in the flow path, at least a part of the liquid chamber being constituted by a flexible member having flexibility, a biasing member configured to bias the flexible member in a direction in which volume of the liquid chamber decreases, a second lid member that forms a second space between the second lid member and the flexible member, and an atmospheric communication section configured to communicate the inside of the second space to atmosphere, the control method for a liquid ejection device includes drawing the liquid into the liquid chamber by displacing the flexible member in a direction in which the volume of the liquid chamber increases by depressurizing the inside of the second space by the decompression source, displacing the pressure receiving section by depressurizing the inside of the first space by the decompression source, closing a part of the flow path by the lever section pushing the valve section based on displacement of the pressure receiving section, and pushing the flexible member with biasing force of the biasing member to push the liquid in the liquid chamber toward the liquid ejection section by causing the inside of the second space to communicate with atmosphere via the atmospheric communication section.

According to this method, it is possible to achieve the same effects as the above-described liquid ejection device.

(H) A method of controlling a liquid ejection device that has a liquid ejection section configured to eject plural types of liquid, a plurality of flow paths that supplies the plural types of liquid to the liquid ejection section, a decompression source, a base on which a part of each of the plurality of flow paths is formed, a plurality of valve sections configured to close the plurality of flow paths, a pressure receiving section having flexibility, a first lid member that forms a first space between the first lid member and the pressure receiving section, a lever section provided in the first space, a plurality of liquid chambers provided between the valve section and the liquid ejection section in the plurality of flow paths, and at least a part of which is configured by a flexible member having flexibility, a plurality of biasing members configured to bias the flexible member in a direction in which volume of the plurality of liquid chambers decreases, a second lid member configured to form a plurality of second spaces between the second lid member and the flexible member at positions corresponding to the plurality of liquid chambers, and an atmospheric communication section configured to communicate the inside of the plurality of second spaces to atmosphere, the control method for a liquid ejection device includes drawing the liquid into the plurality of liquid chambers by displacing the flexible member in a direction in which the volume of the plurality of liquid chambers increases by depressurizing the inside of the plurality of the second space by the decompression source, displacing the pressure receiving section by depressurizing the inside of the first space by the decompression source, closing a part of each of the plurality of flow paths by causing the lever section pushing the plurality of valve sections based on displacement of the pressure receiving section, and pushing out the liquid in the plurality of liquid chambers toward the liquid ejection section by pushing the flexible member with the biasing force of the plurality of biasing members by causing the inside of the plurality of second spaces to communicate with atmosphere by the atmospheric communication section.

According to this method, it is possible to achieve the same effects as the above-described liquid ejection device.

What is claimed is:

1. A valve mechanism provided in a flow path through which fluid flows, the valve mechanism comprising:
- a base in which a part of the flow path is formed;
- a valve section configured to close the flow path;
- a pressure receiving section having flexibility;
- a first lid member that forms a first space between the first lid member and the pressure receiving section; and
- a lever section provided in the first space, wherein
- the lever section pushes the valve section in a direction of closing the flow path based on displacement of the pressure receiving section due to pressure reduction in the first space.

2. A liquid ejection device comprising:
- the valve mechanism according to claim 1;
- a liquid ejection section configured to eject liquid;
- the flow path, which is for supplying the liquid to the liquid ejection section, and
- a decompression source, wherein
- the first lid member has a first communication hole for communicating the decompression source with the first space to communicate, and the decompression source is configured to reduce pressure in the first space via the first communication hole.

3. The liquid ejection device according to claim 2, further comprising:
- a liquid chamber provided in the flow path between the valve mechanism and the liquid ejection section, at least a part of which is constituted by a flexible member having flexibility;
- a biasing member configured to bias the flexible member in a direction in which volume of the liquid chamber decreases;
- a second lid member that forms a second space between the second lid member and the flexible member and is provided with a second communication hole for communicating the decompression source with the second space; and
- an atmospheric communication section configured to communicate the inside of the second space to atmosphere.

4. A valve mechanism provided in a plurality of flow paths through which plural types of fluids respectively flow, the valve mechanism comprising:
- a base in which a part of each of the plurality of flow paths is formed;
- a plurality of valve sections configured to close respective ones of the plurality of flow paths, respectively;
- a pressure receiving section having flexibility;
- a first lid member that forms a first space between the first lid member and the pressure receiving section; and
- a lever section provided in the first space, wherein
- the lever section pushes the plurality of valve sections in a direction of closing the plurality of flow paths based on displacement of a pressure receiving section due to pressure reduction in the first space.

5. A liquid ejection device comprising:

the valve mechanism according to claim 4;

a liquid ejection section configured to eject plural types of liquid;

a plurality of flow paths that supplies the plural types of liquid to the liquid ejection section, and a decompression source, wherein the first lid member has a first communication hole for communicating the decompression source with the first space to communicate, and the decompression source is configured to reduce pressure in the first space via the first communication hole.

6. The liquid ejection device according to claim 5, further comprising:

a plurality of liquid chambers provided between the valve mechanism and the liquid ejection section in the plurality of flow paths, at least a part of which is configured by a flexible member having flexibility;

a plurality of biasing members configured to bias the flexible member in a direction in which volume of the plurality of liquid chambers decreases;

a second lid member that forms a plurality of second spaces between the second lid member and the flexible member at positions corresponding to the plurality of liquid chambers and that is provided with a plurality of second communication holes for communicating the decompression source with the plurality of second spaces; and an atmospheric communication section configured to communicate the inside of the plurality of second spaces to atmosphere.

7. A control method for a liquid ejection device, the liquid ejection device including a liquid ejection section configured to eject liquid, a flow path that supplies the liquid to the liquid ejection section, a decompression source, a base on which a part of the flow path is formed, a valve section configured to close the flow path, a pressure receiving section having flexibility, a first lid member that forms a first space between the first lid member and the pressure receiving section, a lever section provided in the first space, a liquid chamber provided between the valve section and the liquid ejection section in the flow path, at least a part of the liquid chamber being constituted by a flexible member having flexibility, a biasing member configured to bias the flexible member in a direction in which volume of the liquid chamber decreases, a second lid member that forms a second space between the second lid member and the flexible member, and an atmospheric communication section configured to communicate the inside of the second space to atmosphere, the control method for the liquid ejection device comprising:

drawing the liquid into the liquid chamber by displacing the flexible member in a direction in which volume of the liquid chamber increases by depressurizing the inside of the second space by the decompression source;

displacing the pressure receiving section by depressurizing the inside of the first space by the decompression source;

closing a part of the flow path by the lever section pushing the valve section based on displacement of the pressure receiving section; and pushing the flexible member with biasing force of the biasing member to push the liquid in the liquid chamber toward the liquid ejection section by causing the inside of the second space to communicate with atmosphere via the atmospheric communication section.

8. A control method for a liquid ejection device, the liquid ejection device including a liquid ejection section configured to eject plural types of liquid, a plurality of flow paths that supplies the plural types of liquid to the liquid ejection section, a decompression source, a base in which a part of each of the plurality of flow paths is formed, a plurality of valve sections configured to close the plurality of flow paths, a pressure receiving section having flexibility, a first lid member that forms a first space between the first lid member and the pressure receiving section, a lever section provided in the first space, a plurality of liquid chambers provided between the valve section and the liquid ejection section in the plurality of flow paths, and at least a part of which is configured by a flexible member having flexibility, a plurality of biasing members configured to bias the flexible member in a direction in which volume of the plurality of liquid chambers decreases, a second lid member configured to form a plurality of second spaces between the second lid member and the flexible member at positions corresponding to the plurality of liquid chambers, and an atmospheric communication section configured to communicate the inside of the plurality of second spaces to atmosphere, the control method comprising:

drawing the liquid into the plurality of liquid chambers by displacing the flexible member in a direction in which volume of the plurality of liquid chambers increases by depressurizing the inside of the plurality of second space by the decompression source;

displacing the pressure receiving section by depressurizing the inside of the first space by the decompression source, closing a part of each of the plurality of flow paths by causing the lever section pushing the plurality of valve sections based on displacement of the pressure receiving section, and pushing out the liquid in the plurality of liquid chambers toward the liquid ejection section by pushing the flexible member with the biasing force of the plurality of biasing members by causing the inside of the plurality of second spaces to communicate with atmosphere by the atmospheric communication section.

* * * * *